(12) United States Patent
Mathy et al.

(10) Patent No.: US 7,527,842 B2
(45) Date of Patent: May 5, 2009

(54) RECLOSABLE PACKAGING

(75) Inventors: Stefan Mathy, Berlin (DE); Annett Kaeding, Bad Fallingbostel (DE)

(73) Assignee: Wipak Walsrode GmbH & Co. KG, Walsrode (DE)

( * ) Notice: Subject to any disclaimer, the term of this patent is extended or adjusted under 35 U.S.C. 154(b) by 503 days.

(21) Appl. No.: 10/542,622

(22) PCT Filed: Jan. 19, 2004

(86) PCT No.: PCT/EP2004/000365

§ 371 (c)(1),
(2), (4) Date: Nov. 30, 2005

(87) PCT Pub. No.: WO2004/065255

PCT Pub. Date: Aug. 5, 2004

(65) Prior Publication Data

US 2006/0088677 A1    Apr. 27, 2006

(30) Foreign Application Priority Data

Jan. 20, 2003   (DE) ................. 103 02 320

(51) Int. Cl.
*B32B 27/08* (2006.01)
*B32B 33/00* (2006.01)

(52) U.S. Cl. ............. 428/36.7; 428/34.1; 428/35.2; 428/35.3; 428/35.4; 428/35.7; 428/35.8; 428/35.9; 428/36.4; 428/36.6; 428/40.1; 426/127

(58) Field of Classification Search ............... 428/34.1, 428/35.2, 35.3, 35.4, 35.7, 35.8, 35.9, 36.4, 428/36.5, 36.6, 36.7, 40.1, 41.3, 41.5, 41.8, 428/41.9; 426/106, 127

See application file for complete search history.

(56) References Cited

U.S. PATENT DOCUMENTS

| | | | |
|---|---|---|---|
| 3,882,259 A | 5/1975 | Nohara et al. | |
| 4,792,488 A | 12/1988 | Schirmer | |
| 6,056,141 A | 5/2000 | Navarini et al. | |
| 6,113,927 A * | 9/2000 | Hatakeyama | ............... 424/401 |
| 6,302,290 B1 | 10/2001 | Engelaere | |

FOREIGN PATENT DOCUMENTS

| | | |
|---|---|---|
| DE | 694 06 639 | 5/1998 |
| EP | 0 219 329 | 4/1987 |
| EP | 1 138 610 | 10/2001 |
| FR | 28 07 015 | 10/2001 |
| GB | 2 090 191 | 7/1982 |
| WO | WO 97/19867 | 6/1997 |

* cited by examiner

*Primary Examiner*—Jennifer McNeil
*Assistant Examiner*—Walter B Aughenbaugh
(74) *Attorney, Agent, or Firm*—Norris, McLaughlin & Marcus, PA

(57) ABSTRACT

A reclosable packaging comprising a packaging tray that is made of a multilayer film and a lid which is made of a multilayer film. The tray and the lid are joined together in the edge area of the packaging tray via a sealing seam. The multilayer film of the packaging tray or lid is provided with a contact adhesive layer and a migration barrier layer having a thickness of preferably <2 μm.

34 Claims, No Drawings

RECLOSABLE PACKAGING

This is a 371 of PCT/EP2004/000365 filed 19 Jan. 2004 (international filing date).

The present invention relates to a reclosable packaging consisting of a packaging tray for accommodating a material filled therein, preferably a food product, and a lid which is joined to the packaging tray via a sealing seam in the edge region of the packaging tray, either the packaging tray or the lid having a layer made of a pressure-sensitive adhesive and a migration barrier layer with a layer thickness of preferably <2 µm. The packaging is distinguished in particular by low global migration, whereby an impairment in the flavour of the packaged filling material and troublesome development of smell during storage of the packaged filling material are avoided. The packaging according to the invention is easy to handle owing to its excellent opening and reclosing ability.

Reclosable packagings are increasingly used for packaging products of the most varied kinds, in order, on removal of part of the packaged products, to guarantee reclosing and appropriate storage of the non-removed product. This reclosing ability of packagings is made possible by the fact, inter alia, that the packaging material has a layer made of a pressure-sensitive adhesive, which detaches from the adjacent, welded sealing layers when the packaging is opened in the region of the sealing seam, whereby this layer is exposed and after part of the filling material has been removed reclosing is made possible by pressing. This is because the closure arrangement of the multilayer packaging material obtained by sealing the sealing layers in the region of the sealing seam has a greater bond between the sealing layers sealed for closing the packaging of, for example packaging tray and lid, than between the pressure-sensitive adhesive layer and the sealing layers indirectly or directly adjacent and sealed together. Packagings of this kind are described in, inter alia, PCT application WO 97/19867.

Packagings of this kind, of necessity equipped with a layer of pressure-sensitive adhesive, have the disadvantage that low-molecular components may migrate from the pressure-sensitive adhesive layer into the packaged food product, which may lead to deterioration in the flavour and possibly to health risks during storage of the packaged filling material. Additionally, a troublesome smell may develop in the packaging, which the consumer will find unpleasant when opening the packaging or which causes problems during production of the packaging.

If products containing fat, in particular fat-containing foods of liquid or solid type, are to be packaged in reclosable packagings of this kind, this problem is intensified, as fat migrates into the packaging and thus promotes the migration of the low-molecular components of the pressure-sensitive adhesive.

The object was therefore posed of making available a reclosable packaging which does not have these disadvantages and yet allows excellent opening and reclosing of the packaging.

According to the invention this object is achieved by providing a reclosable packaging for various filling materials, preferably food products, in solid, paste-like or liquid form, particularly preferably fat-containing foods, consisting of
A) a lid made of a sealable multilayer film with
   a') a sealing layer facing the filling material and
   g') a carrier layer and
B) a packaging tray produced from a sealable multilayer film with
   a) a sealing layer facing the filling material and
   g) a carrier layer,
wherein the lid A is joined to the packaging tray B) via a sealing seam in the edge region of the packaging tray B), characterised in that either only the multilayer film of the packaging tray B) or only the multilayer film of the lid A) has a layer structure directly adjoining the sealing layer a') or a) and directed outwards from the inside of the packaging, comprising
b) a layer of adhesion promoter,
c) a migration barrier layer consisting of at least 75% by weight ethylene-vinyl alcohol copolymer with a layer thickness of preferably <2 µm and
f) a layer consisting of pressure-sensitive adhesive.

Surprisingly it is possible by a packaging according to the invention structured in this way to limit the global migration, in particular low-molecular portions, out of the packaging material, in particular under the influence of fat, into the interior of the packaging to less than 10 mg global migration/dm$^2$, preferably $\leq$7 mg global migration/dm$^2$, particularly preferably $\leq$5 mg global migration/dm$^2$, thus avoiding impairment of the filling material by migration of low-molecular portions from the packaging material, in particular from the pressure-sensitive adhesive layer f), into the filling material and an unpleasant formation of smell in the packaging. This global migration is determined according to DIN ENV 1186-14.

According to the invention this is possible with the aid of the above-described structure of the packaging tray B) or the lid A), the migration barrier layer of which needs to have only a thickness of <5 µm, preferably of $\leq$2 µm, particularly preferably of 0.5 to <2 µm, most particularly preferably 0.7 to 1.5 µm.

The migration barrier layer c) is composed of at least 75% by weight, preferably 100% by weight, ethylene-vinylalcohol copolymer, wherein the copolymer is preferably composed of 20 to 60 mol %, particularly preferably of 25 to 42 mol %, most particularly preferably of 30 to 40 mol % ethylene. Equally suitable for producing the migration barrier layer c) is a mixture of 75 to 99% by weight ethylene-vinylalcohol copolymer and 1 to 25% by weight ethylene-vinylacetate copolymer, preferably a mixture of 80 to 95% by weight ethylene-vinylalcohol copolymer and 5 to 20% by weight ethylene-vinylalcohol acetate copolymer. The above-described ethylene-vinylalcohol copolymer is used for producing a mixture of this kind and as ethylene-vinylacetate copolymer preferably a copolymer with 2 to 35 mol % vinyl acetate.

The multilayer films used for producing the two parts of the packaging in each case have a sealing layer a) and a sealing layer a') as an outer layer facing the filling material. Olefinic homopolymers or copolymers, such as, for example polyolefins, preferably polyethylenes, ethylene copolymers with further α, β-unsaturated monomers, preferably ethylene-vinylacetate copolymers, or mixtures of said polymers are used to construct these sealing layers. LDPE, HDPE, LLDPE, m-PE or mixtures of said polymers are suitable as polyethylenes, most particularly preferably LDPE ethylene-vinylacetate copolymer or mixtures thereof. The melt flow index of the polymers being used MFI (measured according to ASTM 1238 at 2.16 kg and 190° C.) should preferably amount to at least 2 g/10 min, particularly preferably 3.5 g/10 min, in order to guarantee the desired problem-free opening and reclosing of the packaging according to the invention. It can also be advantageous for this to configure sealing layer a) and/or sealing layer a') as multilayered, i.e. to construct one or both sealing layers of at least two layers of said polymers, which preferably belong to the same type of polymers and particularly preferably also have the same physical properties. Sealing layer a') of the lid A) is preferably composed of identical material to sealing layer a) of the packaging tray B). This simplifies setting the desired tightness of the seal aspired to in the region of the sealing seam between the sealing layers of the packaging tray and the lid, which must be greater than the bonded adhesion between the pressure-sensitive adhesive layer f) and the adjacent migration barrier layer c) or each layer located there-between and directly adjoining layer f). In this way it is possible on first opening the packaging that in the region of the sealing seam said sequence of layers (a) or a') to c) or a) or a') to e)) detaches with the lid from the packaging tray or detaches from the lid and remains on the edge of the packaging tray, whereby the pressure-sensitive adhesive layer f) is exposed in the region of the sealing seam. In this way problem-free reclosing of the packaging after removal of at least part of the packaged filling material becomes possible by pressing the lid in the region of the sealing seam.

The layer of adhesion promoter b) and the optionally present layer of adhesion promoter d) can be composed of any known polymer adhesion promoters suitable for joining sealing layer a) or sealing layer a') to the migration barrier layer c), or the adhesive layer f) or the optionally present layer e). The layer or layers of adhesion promoter is/are preferably substantially composed of an olefinic homopolymer or copolymer with grafted-on maleic anhydride units. The polymers used for producing the layers of adhesion promoter preferably have a melt flow index MFI (measured according to ASTM 1238 at 2.16 kg/190° C.) of at least 2 g/10 min, preferably 3.5 g/10 min. There is preferably arranged between the migration barrier layer c) and the pressure-sensitive adhesive layer f) a layer of adhesion promoter d), the composition of which preferably corresponds to that of the layer of adhesion promoter b).

If there is at least one layer e) made of at least one olefinic homopolymer or copolymer arranged between the migration barrier layer c) and the adhesive layer f), possibly for reasons of production technology, this preferably consists of at least one polyolefin, particularly preferably of polyethylene or ethylene copolymer, particularly preferably ethylene-vinylacetate copolymer with preferably 2 to 35 mol % vinyl acetate or of a mixture of said polymers. This layer e) preferably consists of LDPE, HDPE, LLDPE or m-PE or a mixture of at least two of said polyethylenes or at least one of said polymers with an ethylene-vinylacetate copolymer, most particularly preferably of LDPE, ethylene-vinylacetate copolymer or a mixture thereof. The melt flow index MFI of the polymer material of layer e) is preferably at least 2 g/10 min, preferably 3.5 g/10 min (measured according to ASTM 1238 at 2.16 kg/190° C.). Layer e) and likewise sealing layer a) and/or a') are preferably multilayered and have the same type of polymers. The polymers of sealing layers a) and a') are preferably identical to the polymers of layer e).

In a further preferred embodiment the partial layer sequence a) or a') to e) is symmetrically constructed in relation to the migration barrier layer c).

Layer f) is based on a pressure-sensitive adhesive. These adhesives are sensitive to pressure and in particular stable at ambient temperature. Polymer pressure-sensitive adhesives based on dispersions of, for example, acrylic resins or natural rubber, or as hot melts based on styrene-butadiene block copolymers or styrene-isoprene-butadiene block copolymers or as UV crosslinkable warm melts are suitable for this. Owing to the pressure-sensitive adhesion properties it is also possible, after first opening of the packaging, to close the packaging again by pressing and to continue to store the remaining filling material without impairment by the environment.

The adhesive of layer f) is applied in such an amount that the layer thickness is preferably in the range of 1 to 40 µm, particularly preferably 10 to 25 µm, most particularly preferably 15 to 22 µm.

The total thickness of the layer sequence a) to e) or a') to e) present in each case is preferably in the range of 15 to 70 µm, particularly preferably 20 to 50 µm, most particularly preferably in the range of 25 to 40 µm, wherein the layer a) or a') and the optionally present layer e) should preferably comprise in each case 5 to 15 µm, and the layer of adhesion promoter b) and the optionally present layer of adhesion promoter d), preferably in each case a layer thickness in the range of 3 to 6 µm.

Adjoining the adhesive layer f) is a carrier layer g) preferably forming the outside of the packaging, in particular of the packaging tray B), and based on a thermoplastic material, such as a thermoplastic plastics material, preferably a polyester, a polyolefin or polyamide. Foamed or amorphous polyesters, preferably polyethylene terephthalate, are acceptable as thermoplastic polyesters, polyethylene or polypropylene or their copolymers as polyolefins and polyamide 6,6, most particularly preferably amorphous polyesters, as polyamides. The use of transparent materials is preferred. The thickness of the carrier layer can vary in a wide range and depends, among other things, on to what mechanical stresses the packaging is possibly subjected during use, without the thermo-ductility of the multilayer film used according to the invention being noticeably impaired. The carrier layer preferably has a thickness which corresponds to at least the total thickness of the sequence of layers a) to f), but is preferably a multiple thereof.

A thermoplastic plastics material, such as, for example, a polyolefin, preferably polyethylene, polypropylene or copolymers thereof, a polyester, foamed or amorphous, preferably polyethylene terephthalate, or a polyamide, preferably PA 6,6, is preferably used as carrier layer g') of the lid film. Transparent materials are preferred. Suitable carrier layers can also be stretched longitudinally or biaxially, in order to set appropriate physical properties such as stabilities. The thickness of the carrier layer is preferably at least 25 µm.

The ratio of the thickness of the migration barrier layer c) to the total thickness of the respective multilayer film of the lid A) or the packaging tray B) is preferably 1:1000 to 1:25, preferably 1:100 to 1:30.

Both the carrier layer g) of the packaging tray B) and the carrier layer g') of the lid A can be multilayered. The packaging tray B) and/or the lid A) may be printed and/or coloured.

The entire packaging according to the invention is preferably transparent.

Only the part of the packaging, i.e. of the lid or the packaging tray, which has the layer c) made of pressure-sensitive adhesive is also equipped with the migration barrier layer c) used according to the invention.

To produce the packagings according to the invention the material for the packaging tray and the material for the lid may be made according to different manufacturing processes. The multilayer film from which the packaging tray A) is made, preferably by thermo-deformation, particularly preferably by deep-drawing, can be produced according to any known processes for producing multilayer films. This also applies to the multilayer film of the lid. Preferably recommended is a co-extrusion method in which the polymers of the individual layers, possibly supplemented with the desired additives, are extruded in molten form through a common multi-compartment nozzle. The co-extrusion can be carried out in such a way that a multilayer film is produced on a flat film machine or production takes place according to a film blowing co-extrusion process. It is also possible to produce part of the multilayer film used according to the invention by co-extrusion and to join this partial sequence of layers to the remaining layer, the multilayer film used according to the invention, by calendering via a layer of adhesion promoter. It is also possible to produce the sequence of layers a') to e) or a) to e) in a separate co-extrusion process and preferably to bring it together inline with the carrier layer coated with adhesive. It is likewise possible to join this sequence of layers to a carrier layer carrying the layer of pressure-sensitive adhesive f) via an extruded bonding layer.

To deform the multilayer film to form the packaging tray B) this film is thermo-deformed, preferably with the aid of a deep-drawing machine, and filled inline and, after being supplied with the lid film, sealed to form the packaging according to the invention.

The sealing pressure and the sealing temperature are here set in such a way that the sealing tightness between sealing layer a) of the packaging tray B) and sealing layer a') of the lid A) in the region of the sealing seam is tighter than the binding force between the layer of pressure-sensitive adhesive f) and the sequence of layers a') or a) to e) or c) adjacent in each case. Since similar, if not actually preferably identical, materials are chosen as sealing layer materials for layer a) or a'), this condition can generally be met by simple preliminary trials. The effect of this is that on first opening of the packaging in the region of the sealing seam the adhesive layer f), which is present in the structure of either the packaging tray or the lid, is exposed, whereby problem-free reclosing becomes possible for perfect further storage of the remaining filling material.

The packagings according to the invention are particularly suitable as packagings for foods containing fat, such as, for example, cheese, sausage, ham, cake, confectionary and meat products.

The packagings according to the invention are distinguished, however, not only by drastically reduced migration, in particular under the effect of fat, into the packaging or the packaged filling material, but also by simple and light handling during opening and reclosing of the packaging, which without great effort of force leads to clean separating of the layers adjacent to the pressure-sensitive adhesive layer f) and therefore exposure of the layer of adhesive.

I. Measuring Methods

The global migration is measured according to DIN ENV 1186-14, in which the multilayer film under investigation containing pressure-sensitive adhesive is exposed to the influence of i-octane for five days at 23° C. A circular test item made of the multilayer film to be tested with the sealing layer a) or a') is brought into one-sided contact with the simulant in the migration cell and the global migration, i.e. the migration from the film into the simulant (i-octane), is determined gravimetrically after a contact time of five days at 23° C. (triple measurement) by evaporating the i-octane and weighing the residue.

II. Smell Test or Flavour Test

Identical packaging trays with the dimensions 180 mm×110 mm×30 mm (length×width×depth) were produced on a deep-drawing machine from the multilayer films with a layer structure a) to g) to be tested and always sealed with an identical lid film. Packaging trays of this kind were likewise produced from a multilayer film which has no layer f) and therefore migration barrier layer c). They were closed with a lid film, the structure of which comprises a layer c) and f), by sealing. The packagings were stored for five days at 23° C. and 50% relative humidity. To evaluate the development of smell in a packaging ten test people were charged in each case with assessing the smell on the inside of the packaging after said storage. For this purpose ten items of each kind of the packagings stored were cut open at one corner and the smell inside the packaging was tested by sniffing. The test people evaluated the smell with marks of 1 to 4, 1 standing for very good (smell-free) and 4 for bad or most intense smell. These marks were averaged in each case.

As the development of smell correlates to the impairment of flavour, this means that the impairment of flavour of the filling material in the packaging is greater the more intense the smell ascertained.

EXAMPLES

Example 1

In a co-extrusion machine a partial sequence of layers was made from a sealing layer a), consisting of two layers, 5.1 μm thick in each case, made of LDPE (low density polyethylene) with an MFI of 2.5 g/10 min, a layer of adhesion promoter b) with a thickness of 2.1 μm made of polyethylene with grafted-on maleic anhydride units and an MFI of 4 g/10 min, a migration barrier layer c) with a thickness of 1.8 μm made of an ethylene-vinylalcohol copolymer with 38 mol % ethylene, a layer of adhesion promoter d) with a thickness of 2.1 μm made of the material of layer b) and a multilayer layer e), consisting of a 5.1 μm thick layer of 50% by weight ethylene-vinylacetate copolymer with 5 mol % vinyl acetate and 50% by weight LLDPE, a 3.9 μm thick layer of 50% by weight ethylene-vinylacetate copolymer with 5 mol % vinyl acetate and 50% by weight LLDPE and a 3.6 μm thick layer of 63% by weight LLDPE and 37% by weight LDPE. This partial sequence of layers was joined to a carrier layer g) made of amorphous polyethylene terephthalate with a thickness of 300 μm, which had been coated with a pressure-sensitive adhesive, hot melt HM 570 from Fuller, Germany, with a thickness of 20 μm.

Before a packaging tray was produced from this multilayer film by deep-drawing, the global migration of the multilayer film was measured according to the above-described method, resulting in a global migration of 2.7 mg/dm$^2$.

From the described multilayer film a packaging tray with the dimensions 180 mm×110 mm×30 mm (length×width×depth) was produced in a moulding, filling and sealing machine by deep-drawing and closed inline with a multilayer film as lid made from a carrier layer g') of biaxially stretched polypropylene with a thickness of 50 μm and a double-layer sealing layer a') of in each case 10.1 μm LDPE, produced by co-extrusion, by sealing at the edge of the packaging tray.

The smell test was carried out according to the above-cited method, resulting in a mark of 2. The opening action according to a scale of 1 (good), 2 (average) and 3 (poor) was evaluated at 2.1. The value for the opening action is determined by ten test people and averaged. The same group of test people evaluated the opening and reclosing, which was carried out perfectly more than ten times.

Example 2

A partial sequence of layers was produced by co-extrusion from a sealing layer a) with a thickness of 10 μm made of m-PE with an MFI of 3 g/10 min, a layer of adhesion promoter b) with a thickness of 3 μm, consisting of a polyethylene with grafted-on maleic anhydride units with an MFI of 3.1 g/10 min, a migration barrier layer c) with a thickness of 1 µm made of ethylene-vinylalcohol copolymer with 38 mol % ethylene, an adhesion promoter layer d) with a thickness of 3 µm and identical structure to the adhesion promoter layer b) and a layer e) with a thickness of 10 µm made of m-PE with an MFI of 3 g/10 min.

This partial sequence of layers was joined to a carrier layer g) made of amorphous polyethylene terephthalate with a thickness of 300 µm, which had been coated with a pressure-sensitive adhesive, hot melt HM 570 from Fuller, Germany, in a thickness of 15 µm. The global migration of this thus obtained multilayer film was determined according to the above-cited method. The value for the global migration was 2.4 mg/dm$^2$.

From the multilayer film packaging trays were produced, as described in Example 1, and closed with a lid film consisting of a carrier layer g') made of biaxially stretched polypropylene with a layer thickness of 50 µm and a sealing layer a') with a thickness of 15 µm and consisting of m-PE with an MFI of 3 g/10 min by sealing at the edge of the packaging tray. The smell of packagings of this kind was determined according to the above-cited method and evaluated at 1.6. The opening action, as cited in Example 1, was likewise evaluated at 1.9 and the reclosability at >10.

Comparison Example 1

A carrier layer g) with a thickness of 300 µm made of amorphous polyethylene terephthalate, which had been coated with a pressure-sensitive adhesive corresponding to Example 2 with a thickness of 15 µm, was joined to a sealing layer a) with a thickness of 20 µm made of m-PE with an MFI of 3 g/10 min, corresponding to the sealing layer a) in Example 2. The global migration of this multilayer film was determined at 57 mg/dm$^2$ corresponding to the above-cited method.

Packaging trays were produced from this multilayer film, as set out in Example 1, and closed with a lid film with an identical structure to that in Example 2. Determination of the smell according to the above-cited method amounted to 3.5 and the reclosing and/or opening action corresponded to that of Example 2.

Example 3

A partial sequence of layers was produced by co-extrusion from a sealing layer a') with a thickness of 10 µm made of m-PE with an MFI of 3 g/10 min, a layer of adhesion promoter b) with a thickness of 3 µm consisting of a polyethylene with grafted-on maleic anhydride units with an MFI of 3.1 g/10 min, a migration barrier layer c) with a thickness of 1 µm made of ethylene-vinylalcohol copolymer with 38 mol % ethylene, a layer of adhesion promoter d) with a thickness of 3 µm and identical structure to the layer of adhesion promoter b) and a layer e) with a thickness of 10 µm made of m-PE with an MFI of 3 g/10 min.

This partial sequence of layers was joined to a biaxially stretched carrier layer g') made of polyethylene terephthalate with a thickness of 36 µm, which had been coated with a pressure-sensitive adhesive, hot melt HM 570 from Fuller, Germany, in a thickness of 10 µm. The global migration of this thus obtained multilayer film was determined according to the above-cited method. The value for the global migration was 2.4 mg/dm$^2$. This multilayer film served as lid film.

Packaging trays were produced from a multilayer film consisting of a carrier layer g) made of amorphous polyethylene terephthalate with a thickness of 300 µm joined to a sealing layer a) made of m-PE with a thickness of 40 µm, as set out in Example 1, and closed by the above-described lid film by sealing at the edge region of the packaging tray. Determination of the smell according to the above-cited method amounted to 1.5 and the opening action was evaluated at 1.5 and the reclosability at >10.

Example 4

A partial sequence of layers consisting of a sealing layer a) with a thickness of 10 µm made of a mixture of 50% by weight LDPE and 50% by weight LLDPE with an MFI of 3 g/10 min, a layer of adhesion promoter b) with a thickness of 3 µm consisting of a polyethylene with grafted-on maleic anhydride units with an MFI of 3.1 g/10 min, a migration barrier layer c) with a thickness of 1 µm made of a mixture consisting of 80% by weight ethylene-vinylalcohol copolymer with 38 mol % ethylene and 20% by weight of an ethylene-vinylacetate copolymer with 4.5 mol % vinyl acetate, a layer of adhesion promoter d) with a thickness of 3 µm and identical structure to the layer of adhesion promoter b) and a layer e) with a thickness of 10 µm made of a mixture of 50% by weight LDPE and 50% by weight LLDPE with an MFI of 3 g/10 min was produced by co-extrusion.

This partial sequence of layers was joined to a carrier layer g) made of amorphous polyethylene terephthalate with a thickness of 300 µm, which had been coated with a pressure-sensitive adhesive, hot melt HM 570 from Fuller, Germany, in a thickness of 15 µm. The global migration of this thus obtained multilayer film was determined according to the above-cited method. The value for the global migration was 2.9 mg/dm$^2$.

Packaging trays, as described in Example 1, were produced from the multilayer film and closed by a lid film consisting of a carrier layer g') made of biaxially stretched polypropylene with a layer thickness of 50 µm and a sealing layer a') with a thickness of 15 µm consisting of a mixture of 50% by weight LLDPE and 50% by weight LDPE with an MFI of 3 g/10 min by sealing at the edge of the packaging tray. The smell of such packaging trays was determined according to the above-cited method and evaluated at 1.8. The opening action was likewise evaluated, as set out in Example 1, at 2 and the reclosability at >10.

The invention claimed is:

1. A reclosable packaging unit comprising an interior space for filling with a filling material, said packaging unit comprising:
    A) a lid composed of a first sealable multilayer film, said first sealable multilayer film comprising:
        a') a first sealing layer facing the interior space; and
        g') a first carrier layer positioned outside of said first sealing layer and further removed from said interior space than said first sealing layer; and
    B) a packaging tray composed of a second sealable multilayer film, said second sealable multilayer film comprising:
        a) a second sealing layer facing the interior space; and
        g) a second carrier layer positioned outside of said second sealing layer and further removed from said interior space than said second sealing layer;
    wherein the packaging tray comprises in an edge region thereof a sealing seam;
    wherein the lid is joined to the packaging tray via said sealing seam; and
    wherein only one of the first sealable multilayer film or the second sealable multilayer film, but not both, further comprises in order proceeding from the respective sealing layer towards the respective carrier layer:
  b) a layer of adhesion promoter;
  c) a migration barrier composed of at least 75% by weight ethylene-vinylalcohol copolymer, said migration barrier having a thickness of <2μm; and
  f) a layer of pressure-sensitive adhesive.

2. Packaging according to claim 1, wherein between the migration barrier layer c) and the pressure-sensitive adhesive layer f is arranged, aligned to layer c) a
  d) further layer of adhesion promoter and/or
  e) at least one layer made of olefinic homopolymers or copolymers.

3. Packaging according to either claim 1 or claim 2, wherein the migration barrier layer c) consists of ethylene-vinylalcohol copolymer.

4. Packaging according to either claim 1 or claim 2, wherein the migration barrier layer c) consists of a mixture of 75 to 99% by weight ethylene-vinylalcohol copolymer and 1 to 25% by weight ethylene-vinylacetate copolymer.

5. Packaging according to claim 4, wherein the migration barrier layer c) consists of a mixture of 80 to 95% by weight ethylene-vinylalcohol copolymer and 5 to 20% by weight ethylene-vinylacetate copolymer.

6. Packaging according to claim 4, wherein the ethylene-vinylacetate copolymer is composed of 2 to 35 mol % vinyl acetate.

7. Packaging according to claim 1 or claim 2, wherein the thickness of the migration barrier layer c) is 0.5 to <2 μm.

8. Packaging according to claim 1 or claim 2, wherein the total thickness of the sequence of layers a) or a') to e) amounts to 15 to 70 μm.

9. Packaging according to claims 1 or claim 2, wherein the ratio of the thickness of the migration barrier layer c) to the total thickness of the respective multilayer film of the lid A) or the packaging tray B) is 1:1000 to 1:25.

10. Packaging according to any claim 1 or claim 2, wherein both sealing layer a) and sealing layer a'), identically or differently, have as a polymer component at least one polyolefin, at least one ethylene copolymer, or a mixture of said polymers.

11. Packaging according to claim 10, wherein the sealing layers a) and a') have as a polymer component LDPE, HDPE, LLDPE or m-PE.

12. Packaging according to claim 10, wherein the polymer component of sealing layer a') is identical to the polymer component of sealing layer a) of the packaging tray B).

13. Packaging according to claim 1 or claim 2, wherein layer f) has as a pressure-sensitive adhesive a pressure-sensitive adhesive based on dispersion, as hot melt or UV crosslinkable warm melt.

14. Packaging according to claim 1 or claim 2, wherein layer e) is composed of at least one polyolefin, an ethylene copolymer, or a mixture of said polymers.

15. Packaging according to claim 14, wherein layer e) is composed of LDPE, HDPE, LLDPE or m-PE or a mixture of at least two of said polyethylenes or a mixture with ethylene-vinylacetate copolymer.

16. Packaging according to claim 1 or claim 2, wherein the partial sequence of layers a) or a') to e) is constructed symmetrically in relation to the migration barrier layer c).

17. Packaging according to claim 16, wherein the layers a), a') and e) or the layers b) and d) are composed of the same polymer component.

18. Packaging according to claim 1 or claim 2, wherein the carrier layers g) and g'), identically or differently, consist in each case of a thermoplastic plastics material.

19. Packaging according to claim 18, wherein the carrier layers g) and g'), identically or differently, consist of foamed or amorphous polyester of polyethylene or polypropylene.

20. Packaging according to claim 18, wherein the carrier layer g') of the multilayer film as lid A) is at least longitudinally stretched.

21. Packaging according to claim 1 or claim 2, wherein the packaging has at least a transparent lid A).

22. Packaging according to claim 5, wherein the ethylene-vinylacetate copolymer is composed of 2 to 35 mol % vinyl acetate.

23. Packaging according to claim 7, wherein the thickness of the migration barrier layer c) is 0.7 to 1.5 μm.

24. Packaging according to claim 10, wherein said at least one polyolefin is polyethylene, and said at least one ethylene copolymer is an ethylene-vinylacetate copolymer.

25. Packaging according to claim 11, wherein said polymer component is LDPE, ethylene-vinylacetate copolymer or a mixture thereof.

26. Packaging according to claim 11, wherein the polymer component of sealing layer a') is identical to the polymer component of sealing layer a) of the packaging tray B).

27. Packaging according to claim 14, wherein said at least one polyolefin is a polyethylene, and said ethylene copolymer is an ethylene-vinylacetate copolymer.

28. Packaging according to claim 15, wherein layer e) is composed of LDPE, ethylene-vinylacetate copolymer or a mixture thereof.

29. Packaging according to claim 18, wherein said thermoplastic plastics material is polyester, polyolefin or polyamide.

30. Packaging according to claim 19, wherein said foamed or amorphous polyester is polyethylene terephthalate.

31. Packaging according to claim 20, wherein the carrier layer g') of the multilayer film as lid A) is biaxially stretched.

32. Packaging according to claim 21, wherein the packaging is entirely transparent.

33. A combination comprising a packaging unit according to claim 1 and a filling material in said interior space.

34. The combination according to claim 33, wherein the filling material is a food product.

* * * * *

UNITED STATES PATENT AND TRADEMARK OFFICE
CERTIFICATE OF CORRECTION

PATENT NO. : 7,527,842 B2  Page 1 of 1
APPLICATION NO. : 10/542622
DATED : May 5, 2009
INVENTOR(S) : Mathy et al.

It is certified that error appears in the above-identified patent and that said Letters Patent is hereby corrected as shown below:

Column 2, line 19, "$\leqq 7$" should read -- $\leq 7$ --.

Column 2, line 20, "$\leqq 5$" should read -- $\leq 5$ --.

Column 2, line 30, "$\leqq 2$" should read -- $\leq 2$ --.

Column 9, line 10, "layer f is" should read -- layer f) is --.

Signed and Sealed this

Twenty-seventh Day of July, 2010

David J. Kappos
*Director of the United States Patent and Trademark Office*